Sept. 2, 1952        J. P. SWENTZEL        2,609,318
SILICON CARBIDE REFRACTORY ARTICLE
Filed Dec. 8, 1949
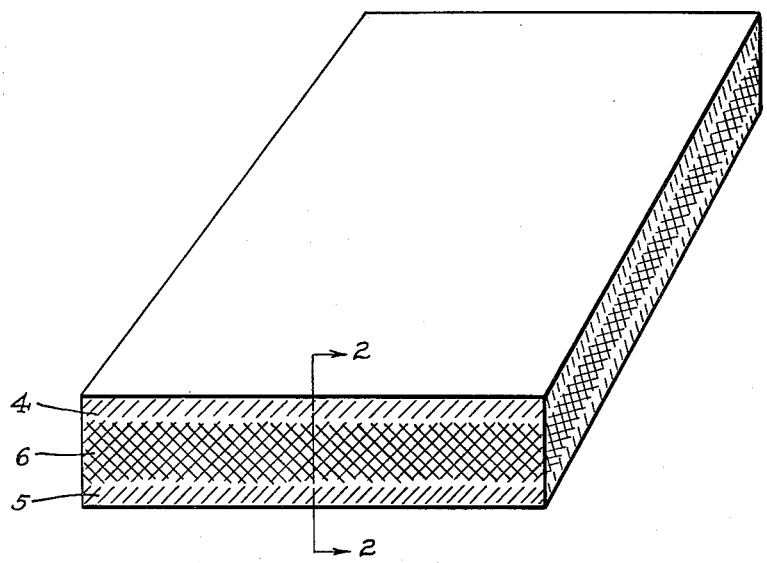
Fig. 1.
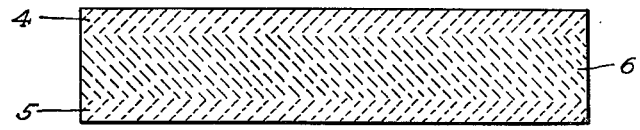
Fig. 2.
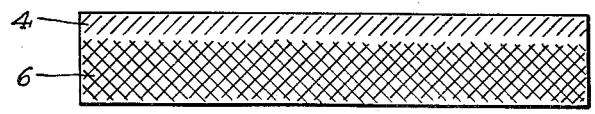
Fig. 3.
*INVENTOR.*
JOHN P. SWENTZEL
BY 
ATTORNEY Patented Sept. 2, 1952

2,609,318

UNITED STATES PATENT OFFICE 2,609,318

SILICON CARBIDE REFRACTORY ARTICLE

John P. Swentzel, Niagara Falls, N. Y., assignor to The Carborundum Company, Niagara Falls, N. Y., a corporation of Delaware Application December 8, 1949, Serial No. 131,854

7 Claims. (Cl. 154—43)

This invention relates to bonded silicon carbide refractory compositions.

More particularly it relates to bonded silicon carbide refractory shapes of a composite nature made from an integral combination of bonded silicon carbide compositions, which shapes not only possess high thermal conductivity and strength at elevated temperatures, and are resistant to oxidation, but also are especially resistant to heat shock and at the same time can be used at high temperatures without imparting discoloration or otherwise staining objects with which the refractory comes into contact.

In my copending application Serial No. 11,356, filed February 26, 1948, I have disclosed and described the making of bonded silicon carbide refractory articles which possess high thermal conductivity and strength at elevated temperatures, are especially resistant to oxidation under severe oxidizing conditions and are satisfactory for use at high temperatures without imparting discoloration to objects or materials with which the refractories come in contact during use with high temperatures. Although the refractory bodies therein disclosed show a marked improvement over the more conventional clay or glass bonded silicon carbide refractory bodies in their resistance to heat shock, they are still limited to some extent in their application because of their still limited resistance to heat shock. In other words, the refractory bodies therein described still tend to crack or spall when exposed to sudden changes in temperature, thereby resulting in failure of the refractories when used in conditions such as those encountered in kilns or furnaces where the fluctuations in temperature are frequent or excessive in amount. The silicon carbide refractories therein disclosed can be briefly described as being composed substantially of granular silicon carbide bonded by a silicon nitride bond which is obtained by firing an article of the desired shape composed of granular silicon carbide and finely divided silicon metal in an atmosphere of nitrogen or some other non-oxidizing atmosphere containing nitrogen at a temperature sufficient to convert the silicon metal to interstitial silicon nitride having the chemical formula $Si_3N_4$ which bonds the silicon carbide granules to form a refractory shape of the desired strength and refractoriness.

I have also been able to make silicon carbide refractory articles of satisfactorily high strength and resistance to oxidation at high temperatures and which, in addition, are substantially more resistant to spalling or otherwise breaking under heat shock, by forming the articles of a mixture of granular silicon carbide and a ferrosilicon or ferromanganese silicon metal in finely divided form, the articles being fired in a non-oxidizing, nitrogenous atmosphere whereby a nitride bond is formed for the silicon carbide particles. While such articles possess a high resistance to breakage under heat shock in addition to a high strength and resistance to oxidation they have been found to have the disadvantage due to the presence of the added iron and manganese constituents of the bond of forming a glaze on the surface of the article which often imparts discoloration and staining to any objects coming in contact with the refractory at high temperatures. For that reason the refractories in spite of their resistance to heat shock have been found unacceptable for many uses, for example, as setter tile in kilns where white ware or other light colored articles are being fired. Also the conventional setter tile refractory wash coatings such as alumina refractory slurries do not satisfactorily adhere to refractory tile or other shapes which are formed from a mixture of silicon carbide and a nitride bond developed from ferromanganese silicon or comparable ferro alloys, thereby making the tile unsatisfactory for use under conditions where it is desired to fire objects without surrounding bedding material.

It is an object of the present invention to provide an improved silicon carbide refractory article which is highly resistant to heat shock or rapid fluctuations in temperature.

It is a further object of the present invention to provide an improved bonded silicon carbide article which will stand up under heavy loads at high temperatures.

It is a still further object to provide a bonded silicon carbide article in which the bond as well as the silicon carbide component is of a refractoriness considerably above that of such common bonding materials as glass, porcelain or the like.

It is a further object to provide a bonded silicon carbide article which in addition to the above properties is non-staining in character at high temperatures.

It is a still further object to provide a silicon carbide body that avoids the disadvantages of silicon carbide refractories of the prior art.

Other objects and advantages accruing from the present invention will become obvious and apparent as the description proceeds.

In accordance with the present invention, bonded silicon carbide articles of a composite but integral nature are made in which the main body portion of the article is composed of granular silicon carbide and a silicon nitride bond containing certain glaze-forming added ingredients such as compounds of iron, manganese and the like. The main body of the article is integrally bonded to a surface portion composed of granular silicon carbide bonded by a silicon nitride bond, the surface portion of the article being substantially free of the glaze-forming constituents present in the interior of the article. The nitride bond in the main body portion of the article is obtained by using a metal alloy such as ferrosilicon or ferromanganese silicon in the raw batch from which the main body portion is made and the nitride bond in the surface portion is obtained by using silicon in the raw batch from which the surface portion of the article is made. The silicon is converted to silicon nitride in the process of firing the article, and at least the silicon, if not all the alloy, is also converted to a nitride bond at the same time.

Since the present invention is especially adapted to the making of bonded silicon carbide setter tile it is to be understood that in referring to a body portion and a surface portion that the surface portion need not extend over and include the entire exterior of the article. For example, a composite setter tile can be made in which one of the expansive flat surfaces of the tile which normally would come in contact with objects being put through a kiln is provided with a surface layer or portion of the above description to provide the article with a non-staining upper surface whereas the under or opposite surface of the tile can be composed of the main body composition. In other words, a composite setter tile can be made with one or both of its expansive flat sides faced with a surface portion composed of silicon carbide particles bonded by a silicon nitride bond obtained by conversion of silicon metal to silicon nitride, and with the main body portion composed of silicon carbide bonded by the nitrided product of a silicon alloy such as ferromanganese silicon or ferrosilicon. Similarly, a tube or other shape may have either its inner and/or its outer curved surface faced with a bonded silicon carbide body having a silicon nitride bond with the balance of the body structure formed of silicon carbide bonded by the nitride product of a silicon alloy of the aforesaid type.

In order that the invention may be more clearly understood reference is made to the figures of the drawing which present one illustrative embodiment of the present invention, and in which, Figure 1 is a perspective view of a silicon carbide setter tile made in accordance with the present invention, Figure 2 is a sectional view through the line 2—2 of Figure 1; and Figure 3 is a view similar to that of Figure 2 showing a modified form of setter tile made in accordance with the present invention in which one surface only of the tile is provided with a non-staining surface portion.

In order that the invention may be more fully understood the following specific examples are submitted for illustrative purposes and indicate the manner in which composite silicon carbide articles bonded by a nitride bond can be formed in accordance with the practices and principles of the present invention.

EXAMPLE I

Silicon carbide setter tile 14″ x 15″ and approximately 1″ thick, such as that illustrated in Figures 1 and 2 of the drawing, have been made by the joint use of the following compositions:

*Composition A*

| | Parts by weight |
|---|---|
| 14–36 mesh size silicon carbide grain | 48 |
| 80 mesh and finer silicon carbide grain | 36 |
| 200 mesh size and finer silicon powder | 16 |
| Dry lignone | 5 |
| Bentonite gel | 6 |

*Composition B*

| | Parts by weight |
|---|---|
| 14–36 mesh size silicon carbide grain | 48 |
| 80 mesh and finer silicon carbide grain | 32 |
| 200 mesh size and finer ferromanganese silicon powder | 10 |
| 200 mesh size silicon powder | 10 |
| Dry lignone | 4 |
| Bentonite gel | 5 |

The ferromanganese silicon alloy used above is one containing approximately 48% silicon, 20% manganese, and the remainder mostly iron. Ferromanganese silicon, or ferrosilicon, alloys of other compositions can be used with satisfactory results, or a mixture of powdered silicon metal together with powdered iron or powdered iron and manganese can be used. It is desirable however that the silicon content amount to at least 50% by weight of the total metal bonding ingredients, and usually 75 to 98% of the total metal content of the raw batch on a dry weight basis, the other alloying metals amounting to 2 to 25% of the metal.

Composition A above is used in the manner described below for making the surface portions 4 and 5 of a setter tile such as that shown in Figures 1 and 2 and Composition B is used as described below for making the body or interior portion 6 of the tile.

The ingredients of each of the Compositions A and B, with the exception of the bentonite gel in each case, are dry mixed in a tumbling barrel for 15 minutes to insure good blending, after which they are wet mixed for an additional 20 minutes in a kneader mixer. Each of the mixes is wet to the proper pressing consistency with the bentonite gel which is made of four parts of water and one part dry bentonite powder. The bentonite gel in Composition A serves to take up the finely divided silicon powder of the mix and in Composition B it serves to take up the finely divided ferromanganese silicon powder, which metal powders are otherwise very fluffy and extremely difficult to handle, and distributes those powders evenly and uniformly throughout the molding mixtures to provide well blended batches of suitable consistency for molding.

A setter tile such as that shown in Figures 1 and 2 is molded by first placing in the mold a sufficient amount of Composition A to provide when finally pressed a layer of that material approximately $\frac{3}{16}$″ thick in the bottom of the mold. The material is leveled off and uniformly distributed over the bottom plate of the mold and, if desired, subjected to a light pressure sufficient to firm the material in position so as to avoid displacement during the subsequent addition of the next layers of material to the mold. A sufficient amount of Composition B is then placed in the mold over the lightly pressed material of Composition A to provide when finally pressed a layer of material of Composition B approximately ½″ in thickness. This material is then distributed evenly over the area of the mold and, again if desired, lightly pressed into position, after which another layer of mix of Composition A sufficient to provide another layer approximately ⅛″ thick when finally pressed placed on top of the lightly pressed Composition A. After the last layer of material has been leveled off and uniformly distributed over the mold area the upper mold plate is put in position on top of the mold contents and the mold placed in a hydraulic press and the tile formed by pressing at a pressure in excess of 5000 pounds per square inch. During the final pressing of the article the three layers of material constituting the entire mold contents are forced together to form an integral body in which Composition B forms a middle core or body portion approximately ½″ thick, faced and bonded on both sides to surface layers of Composition A, each approximately ⅛″ thick. The molded shape is removed from the mold, dried and placed in a muffle furnace. The normal atmosphere in the muffle is replaced by a continuous stream of commercial grade nitrogen having a purity of 99.7%, after which the temperature of the furnace chamber is gradually raised over a period of several hours to 1400° C. and held at that temperature for 12 hours, while a continuous stream of nitrogen is fed into the furnace muffle. The furnace with the nitrogen still flowing is allowed to cool to room temperature or to a temperature convenient for handling the tile whereupon it is removed from the furnace ready for use. Such tile are highly suitable to use in kilns for the firing of white ware and the like where the cycle of heating is relatively rapid and have the dual advantageous features of not only not staining the ware coming in contact with the tile but also of standing up under the rapid fluctuations in temperature involved in the operation of such type kilns.

EXAMPLE II

Referring again to Figure 3, a tile of that type is made in a manner similar to that described above for the making of the tile illustrated in Figures 1 and 2 except that the initial charge of Composition A is not placed in the mold and the amount of Composition B material placed in the mold is correspondingly increased to compensate for the absence of the lower layer of Composition B so that the finally pressed tile will have a thickness in the neighborhood of 1″, although it will consist of only 2 different strata of material. Obviously the thickness of the various layers of material making up the composite article can be varied considerably from the amounts specified in the example above without departing from the sphere of the present invention and will be dependent upon the overall thickness of the tile desired as well as upon the relative importance of the non-staining feature and the resistance to heat shock in the final article, all of which will depend upon the ultimate use for which the article is intended.

It is of interest to note that there is no change in the volume of the articles as a result of the firing operation. It is found upon weighing the molded and dried articles before and after the firing operation that they undergo a gain in weight of approximately 6-8%, which, if calculated on the basis of the combined silicon and silicon alloy content of the article, and corrected for loss of volatile matter, indicates a gain in weight of the bond of sufficient magnitude to show that there has been a substantial conversion of at least the silicon, and some, if not all of the alloying metals in the raw batch to nitrides in the finished article.

The modulus of rupture of silicon carbide articles made in accordance with the compositions and procedures set forth in Example I above is found to be in excess of 6700 pounds per square inch at 1350° C. This figure is approximately twice the strength at that temperature of high grade bonded silicon carbide refractories having conventional glass or porcelain type bonds now on the market.

The combined amount of silicon and ferromanganese silicon or ferrosilicon used in the main body portion of refractory articles made in accordance with the present invention can be varied with satisfactory results between 4 and 40% by dry weight of the raw batch mix. The amount of silicon used in the raw batch from which the surface portions of the article are made can also vary between 4 and 40% dry weight of the raw batch. However, in each portion of the article it is usually desirable to use in the neighborhood of 8-40% combined weight of metal nitride-forming bonding ingredients in order to provide the article with a satisfactory thermal conductivity, high hot strength and resistance to heat shock.

The alloying metals other than the silicon of the ferromanganese silicon and ferrosilicon alloys have been referred to herein as glaze-forming ingredients. This term has been applied to these alloying metals because of the observation that when silicon carbide bodies composed entirely of compositions such as Composition B of Example I are used in which the named alloys are included as a source of the nitride bond such articles develop at the surface during use a certain amount of a glassy material or glaze which tends to stain or otherwise discolor objects with which the body comes in contact, whereas similar silicon carbide bodies such as Composition A of Example I in which the nitride bond is obtained from powdered silicon in the raw batch do not develop the same glaze under the same firing conditions or similar conditions of use. It is believed that in articles of the present invention the presence of these additional metal ingredients in the main body portion of the article, either of themselves or in conjunction with small amounts of silica or other impurities present in the silicon carbide granular material, tends to greatly increase the resistance of the resultant article to cracking or breakage when exposed to heat shock. At the same time the confinement of such so-called glaze-forming constituents to the interior of the article serves the purpose of keeping the surfaces of the article free or substantially free of any undesirable glassy substance which might stain or discolor objects placed in contact with the body during use.

I have found that highly satisfactory results are to be obtained by using commercial grade silicon metal ground to suitable fineness. Analysis of a commercial grade of silicon which I have satisfactorily used in carrying out the present invention discloses, in addition to the silicon, the presence of the following impurities:

| | Per cent |
|---|---|
| Iron | 0.87 |
| Chromium | 0.21 |
| Aluminum | 0.60 |
| Calcium | 0.54 |

In order to obtain a satisfactory conversion of the silicon to silicon nitride within a reasonable period of time when a commercial grade silicon powder of the above type is used the silicon should be fine enough to pass through a screen of around 200 mesh size (U. S. Standard sieve) and finer, which is around 70 to 90 microns in particle size. Still more rapid nitriding is obtained when the silicon is of a fineness in the neighborhood of 10-20 microns and finer. Satisfactory conversion of the silicon to silicon nitride bond also has been obtained with pure silicon (99.8% silicon), although it has been found that when the pure form of silicon is used, the period of time required for nitriding is much longer than that required for nitriding articles of similar size and shape formed of commercial grade silicon of the same degree of fineness provided the other conditions of the nitriding operation are the same. The rate of conversion of the silicon to silicon nitride when pure silicon is used can be increased by a reduction of the silicon to a finer particle size. It also has been found that the rate of conversion of the pure form of silicon to silicon nitride can be increased by adding a small percentage of iron powder, say, in the neighborhood of ¾% to 1% by weight, which is the amount commonly found in commercial grade silicon, to the pure silicon. The greater ease of conversion of the silicon to silicon nitride when commercial grade silicon containing the aforementioned impurities is used as compared with the nitriding action obtained with pure silicon is to be attributed, therefore, to the presence of the small amount of iron impurity commonly found in the commercial grade of silicon metal. Such an amount is insufficient to provide any appreciable amount of glassy material in the finally bonded article.

Although nitrogen gas having a purity of 99.7% has been mentioned for use in the examples set forth above, similar results can be obtained by the use of other non-oxidizing atmospheres containing nitrogen. For example, commercial annealing hydrogen, which has an approximate analysis of 93% nitrogen and 7% hydrogen, or ammonia gas can be similarly used in place of nitrogen.

Although I have indicated a number of non-oxidizing, nitrogenous gases which can be used as a direct source of nitrogen during the nitriding operation by carrying out that reaction in a reaction chamber into which the nitrogenous gas is continuously passed, it is to be recognized that if desired the nitriding reaction can be effectively carried out in other manners providing that the atmosphere immediately adjacent and within the article being nitrided is maintained substantially non-oxidizing in character and providing an ample supply of nitrogen is furnished the article. For example, in firing bodies or molded shapes in accordance with the present invention in which a nitride bond is to be formed the body can be embedded in a suitable mixture of coke and sand and the article fired at the aforementioned temperatures. The silicon of the surface portion, and at least the silicon component of the alloy metal in the main body portion, are converted to silicon nitride by the nitrogen of the air, which penetrates the embedding mixture and reacts with the silicon contained in the articles embedded therein. The coke of the embedding mixture combines with the oxygen of the air and forms carbon monoxide before the free oxygen has an opportunity to reach the articles being fired, so that the gases penetrating to the article are substantially a mixture of nitrogen and carbon monoxide. Under these conditions substantially all the silicon will combine with the nitrogen to form silicon nitride. Obviously, sufficient coke must be provided in the mixture to provide an excess of carbon, so that carbon monoxide will be formed rather than carbon dioxide, and so that no free oxygen will be present. The embedding material must be of sufficient quantity to function in the prescribed manner. As further assurance that an ample supply of oxygen-free nitrogen is freely available to each article being thus fired, each individual shape must be spaced from adjoining articles with ample intervening embedding material. Otherwise, satisfactory nitriding does not take place in a reasonable length of time.

Moreover, although a specific temperature has been recited in the aforementioned examples for the nitriding operation, and best results, i. e., most efficient and thorough conversion of the silicon to silicon nitride are found to take place when the nitriding operation is performed at temperature ranges slightly below the melting point of silicon (1420° C.), as, for example, 1350-1400° C., satisfactory nitriding has been obtained at temperatures as low as in the neighborhood of 1300° C. Furthermore, during the nitriding operation, and particularly after the nitriding has progressed for some time, the temperatures can be raised well above the melting point of silicon as further assurance of the substantially complete conversion of the silicon to silicon nitride.

The articles made in accordance with the present invention may be molded by any of the well-known methods including pressure molding, machine tamping, hand tamping, jolting, vibrational tamping, air hammer flat- or edge-tamping, or slip casting.

It is to be understood that the products of the present invention in its various modifications are not limited to any specific field or fields of use such as might be defined by the specific examples previously set forth. The products can be made in any desired shape. They are, therefore, not only suited for many of the uses for which industrial refractories are required, including bricks, blocks, setter tile, muffles, kiln furniture, and special shapes for application in and around furnaces and other high temperature equipment, but they are also well suited for many specialty high temperature applications, such as jet engine combustion chambers, linings for exhaust nozzles, rocket combustion chambers and exhaust nozzles, turbine blades, stator blades, lens fusion blocks, spark plug bodies, and the like. They are also suitable for the fabrication of laboratory ware, including combustion boats, crucibles, burner holders, and other shapes. Obviously, that composition constituting the surface portion of the article may extend over the entire exterior of the article or only that selected part of the exterior which it is desired in use should be substantially free of glaze or glaze-developing material.

Having thus described the invention it is desired to claim:

1. A bonded silicon carbide refractory article comprising a surface layer of silicon nitride-bonded silicon carbide, the silicon nitride thereof having the chemical formula $Si_3N_4$, said surface layer being integral with a main body portion comprising silicon carbide bonded by silicon nitride of the chemical formula $Si_3N_4$ and containing 2 to 25% of iron and manganese.

2. A bonded silicon carbide refractory article comprising a surface portion comprising silicon carbide grains and 4 to 40% of a silicon nitride bond in which the silicon nitride has the chemical formula $Si_3N_4$ and a main body portion comprising silicon carbide grains bonded by the nitride reaction product of 4 to 40% of ferromanganese silicon.

3. A bonded silicon carbide refractory article comprising a surface portion comprising silicon carbide grains and 4 to 40% of a silicon nitride bond in which the silicon nitride has the chemical formula $Si_3N_4$ and a main body portion comprising silicon carbide grains bonded by the nitride reaction product of 4 to 40% of ferrosilicon.

4. A bonded silicon carbide refractory article comprising a surface portion comprising silicon carbide grains and 4 to 40% of a silicon nitride bond in which the silicon nitride has the chemical formula $Si_3N_4$ and a main body portion comprising silicon carbide grains bonded by 4 to 40% of a silicon nitride bond containing 2 to 25% of iron and manganese, the silicon nitride having the chemical formula $Si_3N_4$.

5. A bonded silicon carbide refractory article comprising a surface layer of silicon nitride-bonded silicon carbide, the silicon nitride thereof having the chemical formula $Si_3N_4$, said surface layer being integral with a main body portion comprising silicon carbide bonded by silicon nitride of the chemical formula $Si_3N_4$ and containing 2 to 25% of an alloying metal selected from the group consisting of iron and a combination of iron and manganese.

6. A bonded silicon carbide refractory article comprising a surface layer of silicon nitride-bonded silicon carbide, the silicon nitride thereof having the chemical formula $Si_3N_4$, said surface layer being integral with a main body portion comprising silicon carbide bonded by silicon nitride of the chemical formula $Si_3N_4$ and containing 2 to 25% of iron.

7. A bonded silicon carbide refractory article comprising a surface portion comprising silicon carbide grains and 4 to 40% of a silicon nitride bond in which the silicon nitride has the chemical formula $Si_3N_4$ and a main body portion comprising silicon carbide grains bonded by the nitride reaction product of 4 to 40% of a silicon alloy selected from the group consisting of ferromanganese silicon and ferrosilicon.

JOHN P. SWENTZEL.

REFERENCES CITED

The following references are of record in the file of this patent:

UNITED STATES PATENTS

| Number | Name | Date |
|---|---|---|
| 866,444 | Egly | Sept. 17, 1907 |
| 1,345,377 | Linbarger | July 6, 1920 |
| 2,118,789 | Fisher | May 24, 1938 |
| 2,364,108 | Swentzel | Dec. 5, 1944 |
| 2,406,275 | Wejnarth | Aug. 20, 1946 |